(12) United States Patent
Willis

(10) Patent No.: US 7,728,950 B2
(45) Date of Patent: Jun. 1, 2010

(54) ANTICAMCORDER MEDIA PROJECTION USING ENHANCED FRAME RATE

(75) Inventor: Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 656 days.

(21) Appl. No.: 11/666,670

(22) PCT Filed: Nov. 1, 2004

(86) PCT No.: PCT/US2004/036277

§ 371 (c)(1),
(2), (4) Date: Apr. 30, 2007

(87) PCT Pub. No.: WO2006/049616

PCT Pub. Date: May 11, 2006

(65) Prior Publication Data

US 2008/0043202 A1 Feb. 21, 2008

(51) Int. Cl.
G03B 21/32 (2006.01)
G03B 21/38 (2006.01)

(52) U.S. Cl. .................... 352/40; 352/167; 352/244; 380/201

(58) Field of Classification Search .................... 352/40, 352/92, 167, 169, 244; 380/201, 204, 252
See application file for complete search history.

(56) References Cited

U.S. PATENT DOCUMENTS 5,680,454 A * 10/1997 Mead .................... 380/204
6,529,600 B1 * 3/2003 Epstein et al. .............. 380/252
7,242,850 B2 * 7/2007 Cok ........................ 386/73
7,574,004 B2 * 8/2009 Mihota ..................... 380/203
7,634,134 B1 * 12/2009 So ........................ 382/173
2004/0033060 A1 2/2004 Beaton
2005/0129230 A1 6/2005 Mihota
2005/0265577 A1 * 12/2005 DeCegama ................ 382/100
2008/0309883 A1 * 12/2008 Goodhill et al. ............ 352/40
2009/0129746 A1 * 5/2009 Isnardi et al. .............. 386/94

FOREIGN PATENT DOCUMENTS

| EP | 0851678 | 7/1998 |
| WO | WO 99/67950 | 12/1999 |
| WO | WO 00/74366 | 7/2000 |
| WO | WO 2004/071081 | 8/2004 |

OTHER PUBLICATIONS

Search Report Dated.

* cited by examiner

*Primary Examiner*—William C Dowling
(74) *Attorney, Agent, or Firm*—Robert D. Shedd; Robert B. Levy; Wan Yee Cheung

(57) ABSTRACT

A method for presenting video content including displaying the video content at an enhanced frame rate selectively modified to interfere with a recording of the video content by a camcorder. For example, the video content can be displayed at a frame rate of 54 pictures per second or a frame rate of 66 pictures per second. For implementation of the enhanced frame rate, a first picture can be displayed within the video content a first number of times and at least a second picture can be displayed a different number of times.

16 Claims, 5 Drawing Sheets

ANTICAMCORDER MEDIA PROJECTION USING ENHANCED FRAME RATE

This application claims the benefit, under 35 U.S.C. §365 of International Application PCT/US2004/036277, filed Nov. 1, 2004, which was published in accordance with PCT Article 21(2) on May 11, 2006 in English.

BACKGROUND OF THE INVENTION

1. Statement of the Technical Field

The inventive arrangements relate to the field of protecting films against illegal copying.

2. Description of the Related Art

Piracy issues in connection with the theatrical exhibition of motion picture films are well known. Once a film distributor distributes prints of a motion picture film to exhibitors for theatrical exhibition, a certain degree of control over the product is lost. In the regular course of exhibiting the film, a customer in the theater may surreptitiously record the film using, for example, a hand held camcorder. At a more sophisticated level, a person seeking to obtain an illegal copy of a film print may gain access to a theater projection booth in collusion with an employee of the exhibitor and make a copy of the film after hours in a relatively controlled environment. In such an environment, the audio from the projection equipment can be directly fed to the camcorder. A tripod can be used to ensure a clear and steady picture. As a result, an illicit copy can be made. Thus, a method is needed to reduce the quality of such illicit copies so that the copies will be undesirable to consumers.

SUMMARY OF THE INVENTION

The present invention relates to a method for presenting media content including displaying the media content at an enhanced frame rate selectively modified to interfere with a recording of the media content by a camcorder. For example, the media content can be displayed at a frame rate of 54 pictures per second or a frame rate of 66 pictures per second.

For implementation of the enhanced frame rate, a first picture can be displayed within the media content a first number of times and at least a second picture can be displayed a different number of times. For example, in one embodiment, a first picture can be sequentially displayed within the media content three times, a second picture three times, a third picture three times and a fourth picture two times. The picture display period can be about 15.15 milliseconds and a blanking interval can occur immediately after displaying each of the pictures. This embodiment can be used to convert film content from a 24 picture per second frame rate to a 66 picture per second frame rate.

In another embodiment, a first picture can be sequentially displayed within the media content three times, a second picture two times, a third picture two times and a fourth picture two times. The picture display period can be about 18.5 milliseconds and a blanking interval can occur immediately after displaying each of the pictures. This embodiment can be used to convert film content from a 24 picture per second frame rate to a 54 picture per second frame rate.

A projection system is also disclosed for presenting media content. The projection system can include a projector that displays the media content at an enhanced frame rate selectively modified to interfere with a recording of the media content by a camcorder. For example, the projector can be used to implement the aforementioned method.

DETAILED DESCRIPTION OF THE PREFERRED EMBODIMENTS

An embodiment in accordance with the present invention pertains to a method for presenting media content at an enhanced frame rate, which adversely affects the quality of any recordings that may be made of the media content using a conventional image capture device, such as a camcorder. More specifically, if a camcorder is recording the media content at a frame rate that is different than a frame rate at which the media content is displayed, a substantial flicker in the recording will result. For example, if the media content is presented at a frame rate of 66 pictures per second, but recorded by a camcorder at a frame rate of 60 pictures per second, a 6 Hz flicker will be recorded in the media content. Notably, a 6 Hz flicker is known to be especially irritating to viewers.

Figure 1:
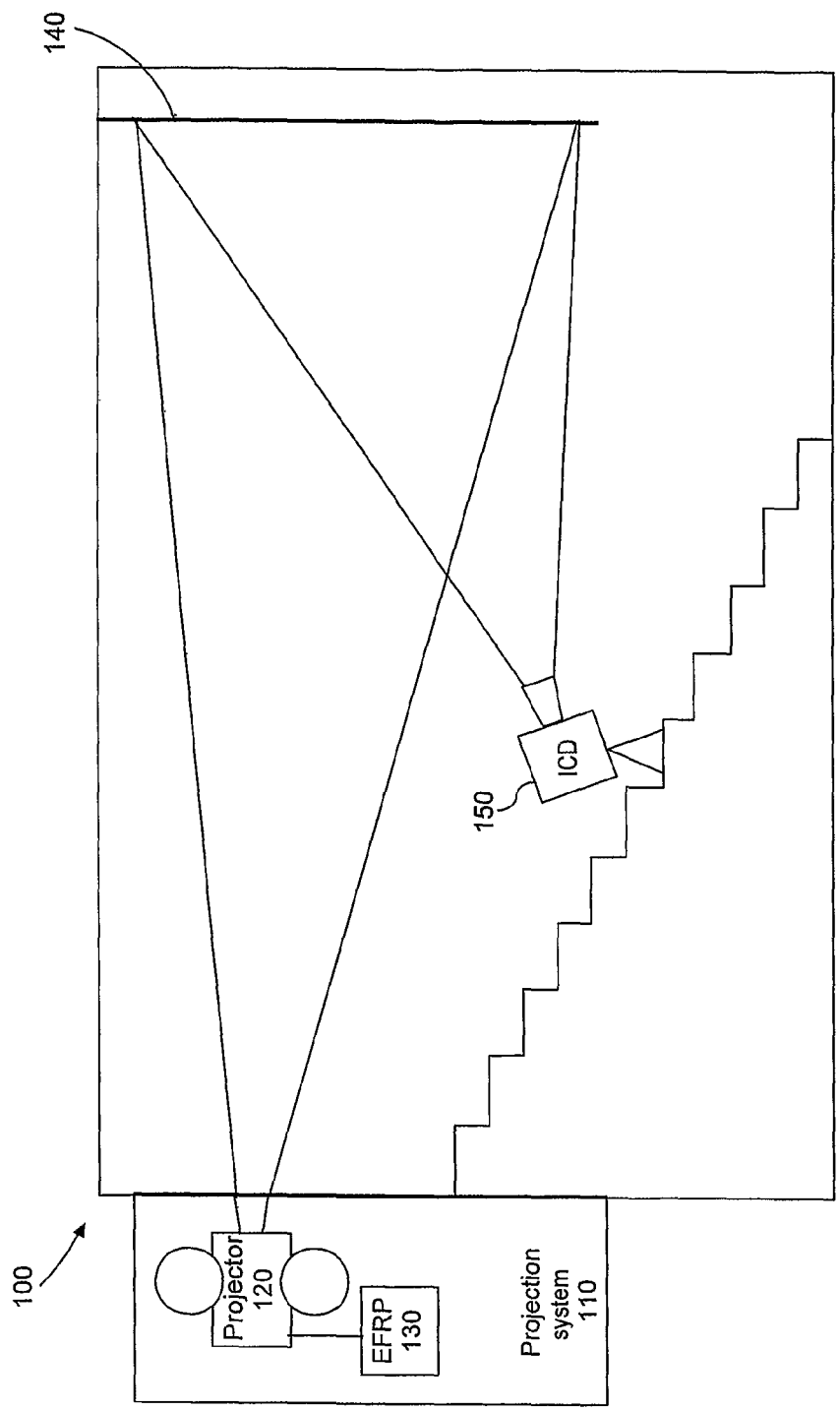
FIG. 1 is a diagram of a projection room that is useful for understanding the invention.

Referring to FIG. 1, a media projection room 100 is depicted which includes a projector system 110 that presents media content on a screen 140 at an enhanced frame rate selectively modified to interfere with a recording of the media content by an image capture device 150. The media projection room 100 can be a screen room, an editing facility, a theater, a living room, or any other location where a media presentation can occur. The media content can be video content, film content, or any other sequence of images.

The projector system 110 can include a projector 120 and an enhanced frame rate processor (EFRP) 130. In one arrangement, the projector 120 can be a film projector. In another arrangement, the projector 120 can be a digital image projector. The projector 120 is shown as being located in front of the screen 140. Nevertheless, the projector 120 also can be located behind the screen 140, for example when the projector 120 is incorporated into a rear projection display, such as a rear projection television. The EFRP 130 can be a processing system which provides signals for controlling the frame rate at which the projector presents media content. As shown, the EFRP 130 is external to the projector 120; however, it should be noted that in an alternate arrangement the EFRP 130 can be included within the projector.

Figures 2, 4:
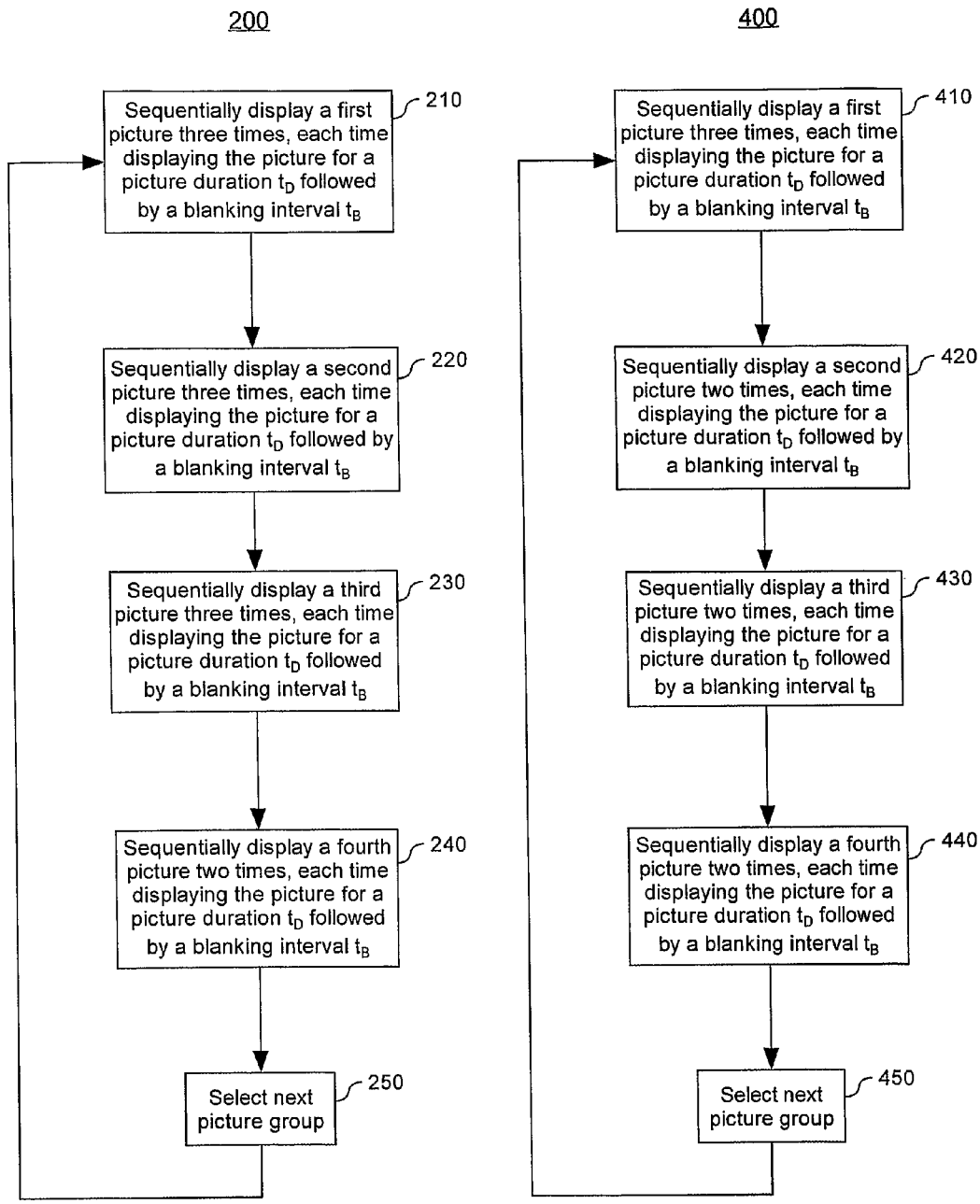
FIG. 2 is a flow chart showing a method for presenting content at an enhanced frame rate in accordance with an embodiment of the present invention.
FIG. 4 is a flow chart showing a method for presenting media content at an enhanced frame rate in accordance with another embodiment of the present invention.

A flowchart is shown in FIG. 2 that is useful for understanding a method 200 for presenting media content at an enhanced frame rate in accordance with an embodiment of the present invention. To achieve the frame rate conversion, the display of film frame pictures within the media content can be repeated a number of times in accordance with a particular presentation scheme. The present example represents a conversion method for producing a 66 picture per second frame rate for display of media content that was recorded at a 24 picture per second frame rate. This method 200 can be referred to as 3-3-3-2 pulldown.

Figure 3:
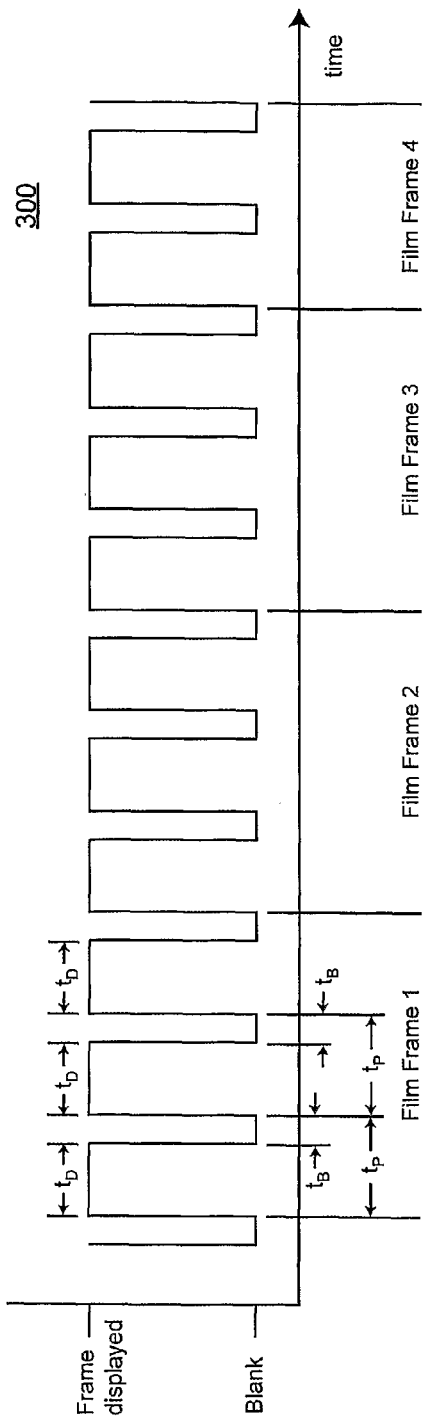
FIG. 3 shows a frame timing diagram which is useful for understanding the method of FIG. 2.

Beginning at step 210, a first film frame picture (first picture) can be sequentially displayed three times. Also making reference to the timing diagram 300 of FIG. 3, each picture can be displayed for a picture duration $t_D$ followed by a blanking interval $t_B$. Presentation of a next picture can begin after the blanking interval $t_B$ is complete. By way of example, the picture duration $t_D$ can be about 12.15 milliseconds and the blanking interval $t_B$ can be about 3 milliseconds. Nonetheless, the invention is not limited in this regard and it should be noted that other picture duration and blanking interval values are within the scope of the present invention. Notably, the picture duration $t_D$ and blanking interval $t_B$ should be selected so that the blanking interval $t_B$ is long enough to be perceived in an illicit recording of the media content made with a recording device, such as a camcorder, but not so long as to become distracting when the media content is being viewed from the original recording. For instance, the blanking interval $t_B$ can be in the range of about 1 millisecond to about 10 milliseconds.

The period comprising the picture duration $t_D$ and the blanking interval $t_B$ can be referred to as a picture display interval $t_P$, which is the period between sequential picture display instances. The picture display interval $t_P$ can be selected to achieve the desired display frame rate. For example, to produce a 66 picture per second frame rate for display of the media content, the picture display interval can be selected to be about 15.15 milliseconds.

At step 220, a second film frame picture (second picture) can be displayed three times. Continuing to step 230, a third film frame picture (third picture) can be displayed three times. Finally, at step 240 fourth film frame picture (fourth picture) can be displayed two times. In each of the steps 220, 230, 240, the respective pictures can be displayed for the picture duration $t_D$, and followed by the blanking interval $t_B$. Proceeding to step 250, the process then can repeat for each set of four frames until the presentation of media content is complete.

Referring to FIG. 4 a flow chart is presented which shows a method 400 for presenting media content at an enhanced frame rate in accordance with another embodiment of the present invention. The method 400 produces a 54 picture per second frame rate for display of media content that was recorded at a 24 picture per second frame rate. This method 200 can be referred to as 3-2-2-2 pulldown.

Figure 5:
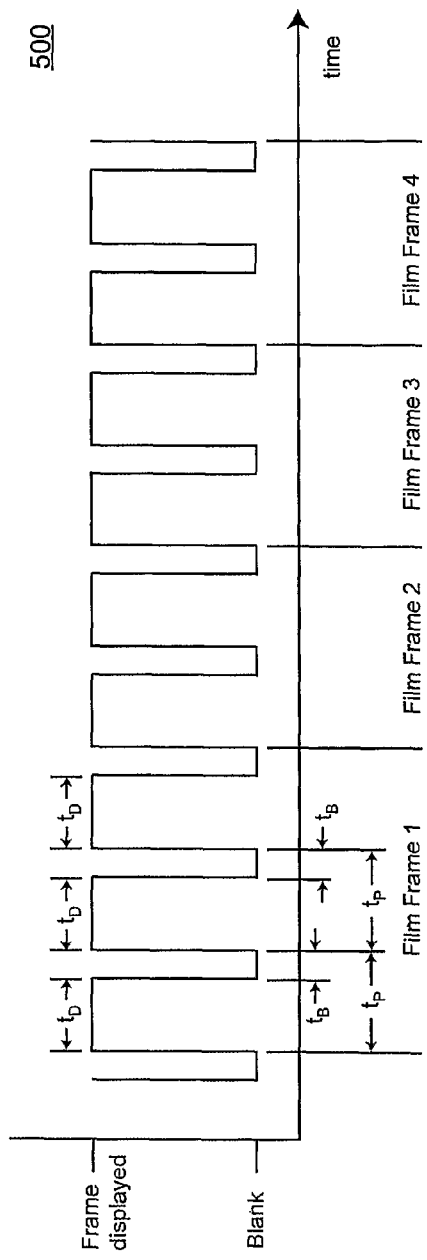
FIG. 5 shows another frame timing diagram which is useful for understanding the method of FIG. 4.

Beginning at step 410, the first picture can be sequentially displayed three times. Making reference to the timing diagram 500 of FIG. 5, each picture again can be displayed for a picture duration $t_D$ followed by a blanking interval $t_B$. In this instance, the picture display interval $t_P$ can be 18.5 milliseconds to achieve the 54 picture per second display rate.

At step 420, the second picture can be displayed two times, at step 430 the third picture can be displayed two times, and at step 440 the fourth picture also can be displayed two times. Again, in each of the steps 420, 430, 440, the respective pictures can be displayed for the picture duration $t_D$, followed by the blanking interval $t_B$. Proceeding to step 450, the process again can repeat for each set of four frames until the presentation of media content is complete. The picture duration $t_D$ and/or blanking interval $t_B$ as described in FIGS. 4 and 5 can have different values than the picture duration $t_D$ and blanking interval $t_B$ as previously described for FIGS. 2 and 3. For example, the picture duration $t_D$ can be 15.0 milliseconds and the blanking interval $t_B$ can be 3.5 milliseconds. Nonetheless, the invention is not limited in this regard and other picture duration and blanking interval values are within the scope of the present invention.

At this point it should be noted that the flow charts and timing diagrams presented herein are only examples of embodiments that can be implemented. Importantly, any suitable frame rate conversion can be used so long as it adversely affects the quality of a recording that may be made of the media content using an image capture device.

Figure 6:
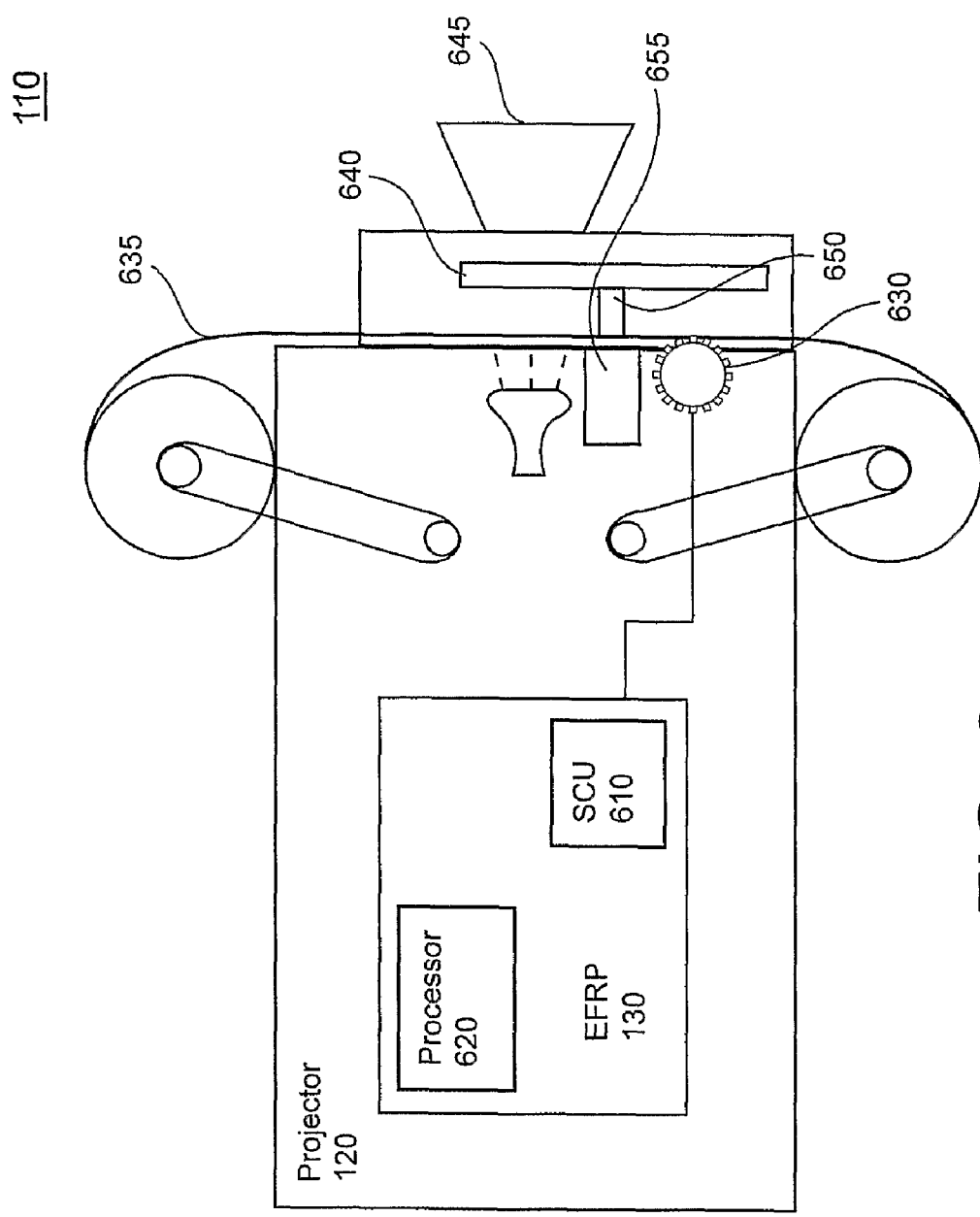
FIG. 6 depicts an example projection system in accordance with an embodiment of the present invention.

Referring to FIG. 6, an example of the projection system 110 of FIG. 1 is shown. As noted, the EFRP 130 can be incorporated into the projector 120 to implement the frame rate conversion. The EFRP 130 can incorporate one or more sprocket control units 610 operatively controlled by a processor 620. The processor 620 can be a central processing unit (CPU), a digital signal processor (DSP), an application specific integrated circuit (ASIC), or any other processor suitable for generating the signals that control the frame rate at which the projector 120 presents the media content. Further, software and/or firmware can be provided in a data store (not shown) for execution by the EFRP 130.

The processor 620 can signal the sprocket control unit 610 to operate one or more sprockets 630 to advance film 635 each time a new picture is to be displayed. For example, if the frame rate conversion discussed in FIG. 2 is implemented by the film projection system 110, the sprocket 630 can sequentially advance the film 635 three times about every 45.45 milliseconds so that each of the first three pictures is positioned for display behind a lens 645 for three picture display intervals, and then advance the film one time after about 30.30 milliseconds so that the fourth picture is positioned for display behind the lens 645 for two picture display intervals. The sprocket control unit 630 can repeat the process with every sequential group of four pictures contained in the film 635.

Figure 7:
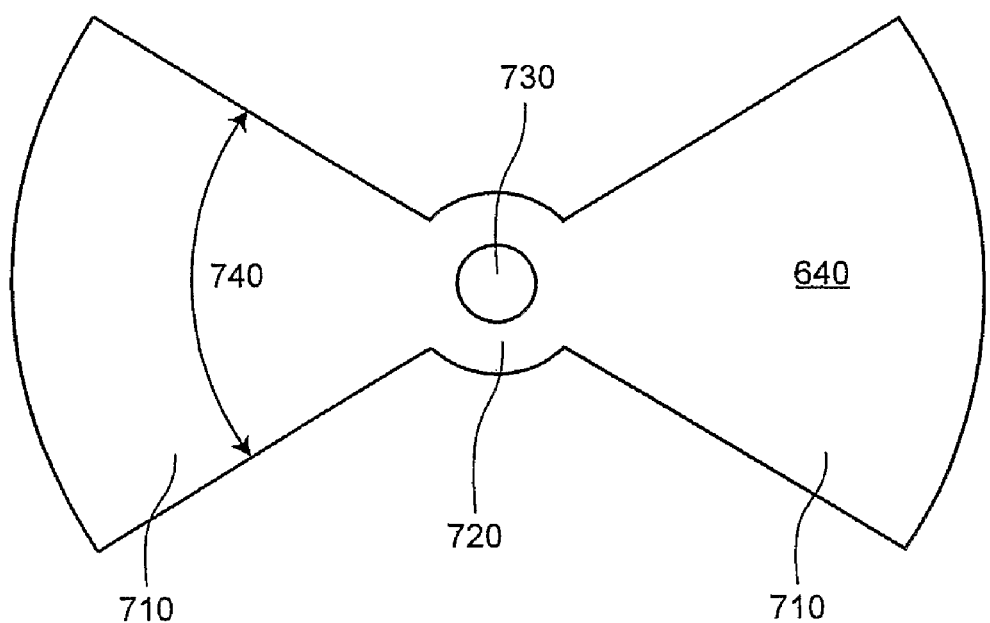
FIG. 7 depicts an example butterfly valve in accordance with an embodiment of the present invention.

A butterfly valve 640 can be disposed between the film 635 and the lens 645 to control the picture duration $t_D$ and blanking interval $t_B$. An example of the butterfly valve 640 is shown in FIG. 7. The butterfly valve 640 can be formed from any rigid or semi-rigid material that is not transmissive to light. For example, the butterfly valve 640 can be stamped from a metal sheet, such as steel, aluminum, copper, and so on. Referring both to FIG. 6 and FIG. 7, the butterfly valve 640 can include one or more radial members 710 extending from a center member 720. The center member 720 can include an orifice 730 that connects to an axle 650 that is rotated by a motor 655.

In operation, the axle 650 can rotate the butterfly valve 640 about an axis defined by the axle 650 such that the radial members 710 intermittently block projection of pictures through the lens 645. An angular width 740 of the radial members 710 and rotational velocity of the butterfly valve 640 can be selected so that the radial members 710 block projection of the pictures for a period equal to the blanking interval $t_B$, and projection of the pictures is unblocked for a period equal to picture duration $t_D$.

In the case that the projector 120 is a digital projector, the blanking interval $t_B$ and picture duration $t_D$ can be digitally controlled by a processor, as would be known to the skilled artisan. In another arrangement, the butterfly valve 640 can be mechanically or electronically synchronized with the sprocket 630.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. A method for presenting media content comprising displaying the media content at an enhanced frame rate selectively modified to interfere with a recording of the media content by a camcorder;

wherein said displaying step comprises:

sequentially displaying a first picture within the media content a first number of times per frame while said media content is displayed at a first frame rate; and sequentially displaying a second picture within the media content a second number of times per frame while said media content is displayed at a second frame rate different from said first frame rate.

2. The method according to claim 1, further comprising selecting the frame rate to be at least one frequency selected from group consisting of 54 pictures per second and 66 pictures per second.

3. The method according to claim 1, further comprising:

sequentially displaying a first picture within the media content three times;

sequentially displaying a second picture within the media content three times;

sequentially displaying a third picture within the media content three times; and sequentially displaying a fourth picture within the media content two times.

4. The method according to claim 3, further comprising selecting a picture display period to be about 15.15 milliseconds.

5. The method according to claim 3, further comprising providing a blanking interval immediately after displaying each of the pictures.

6. The method according to claim 1, further comprising:

sequentially displaying a first picture within the media content three times;

sequentially displaying a second picture within the media content two times;

sequentially displaying a third picture within the media content two times; and sequentially displaying a fourth picture within the media content two times.

7. The method according to claim 6, further comprising selecting a picture display period to be about 18.5 milliseconds.

8. The method according to claim 6, further comprising providing a blanking interval immediately after displaying each of the pictures.

9. A projection system for presenting media content comprising a projector that displays the media content at an enhanced frame rate selectively modified to interfere with a recording of the media content by a camcorder; comprising first means for sequentially displaying a first picture within said media content a first number of times per frame while said media content is displayed at a first frame rate, and second means for sequentially displaying a second picture within said media content a second number of times per frame while said media content is displayed a second frame rate different from said first frame rate.

10. The projection system of claim 9, wherein the projector produces a frame rate selected from group consisting of 54 pictures per second and 66 pictures per second.

11. The projection system of claim 9, wherein the projector sequentially displays a first picture within the media content three times, sequentially displays a second picture within the media content three times, sequentially displays a third picture within the media content three times, and sequentially displays a fourth picture within the media content two times.

12. The projection system of claim 11, wherein the projector displays the pictures with a picture display period of about 15.15 milliseconds.

13. The projection system of claim 11, wherein the projector provides a blanking interval immediately after displaying each of the pictures.

14. The projection system of claim 9, wherein the projector sequentially displays a first picture within the media content three times, sequentially displays a second picture within the media content two times, sequentially displays a third picture within the media content two times, and sequentially displays a fourth picture within the media content two times.

15. The projection system of claim 14 wherein the projector displays the pictures with a picture display period of about 18.5 milliseconds.

16. The projection system of claim 14, wherein the projector provides a blanking interval immediately after displaying each of the pictures.

* * * * *